US 9,309,794 B2

(12) United States Patent
Eastwood et al.

(10) Patent No.: US 9,309,794 B2
(45) Date of Patent: Apr. 12, 2016

(54) SYSTEM AND METHOD FOR MONITORING ENGINE OIL PRESSURE (75) Inventors: James Eastwood, Brentwood (GB); Simon Cowling, London (GB)

(73) Assignee: Ford Global Technologies, LLC, Dearborn, MI (US)

(*) Notice: Subject to any disclaimer, the term of this patent is extended or adjusted under 35 U.S.C. 154(b) by 965 days.

(21) Appl. No.: 13/490,354

(22) Filed: Jun. 6, 2012

(65) Prior Publication Data
US 2012/0316751 A1 Dec. 13, 2012

(30) Foreign Application Priority Data

Jun. 9, 2011 (GB) .................................. 1109668.2

(51) Int. Cl.
- *F01M 11/10* (2006.01)
- *F01M 1/20* (2006.01)
- *F01L 1/344* (2006.01)

(52) U.S. Cl.
CPC .................. *F01M 1/20* (2013.01); *F01M 11/10* (2013.01); *F01L 2001/34423* (2013.01); *F01L 2800/05* (2013.01); *F16N 2250/04* (2013.01)

(58) Field of Classification Search
CPC ......... F01M 1/20; F02M 11/10; F02M 11/12; F01L 2800/05; F01L 2800/11; F01L 2800/12; F01L 2001/34423; F16N 2250/04; F16N 2250/05
USPC ......... 123/90.15; 701/102, 107; 73/1.57, 1.71
See application file for complete search history.

(56) References Cited

U.S. PATENT DOCUMENTS

| | | | | |
|---|---|---|---|---|
| 5,646,341 A | * | 7/1997 | Schricker | F01M 11/10 701/34.4 |
| 6,196,174 B1 | * | 3/2001 | Wada | F01L 1/3442 123/90.15 |
| 6,343,580 B2 | * | 2/2002 | Uchida | F01L 1/24 123/90.17 |
| 6,536,389 B1 | * | 3/2003 | Shelby | F01L 1/34 123/90.15 |
| 6,561,015 B1 | | 5/2003 | Pfeiffer | |
| 7,246,583 B2 | | 7/2007 | Cinpinski et al. | |
| 8,494,748 B2 | * | 7/2013 | Lee | B60W 10/06 701/84 |
| 2003/0005900 A1 | * | 1/2003 | Katayama | F01L 1/26 123/90.17 |
| 2003/0226533 A1 | * | 12/2003 | Fujiwara | F01L 1/34 123/90.17 |

(Continued)

FOREIGN PATENT DOCUMENTS

| | | |
|---|---|---|
| CN | 1940256 A | 4/2007 |
| JP | 2011021555 A | 2/2011 |
| KR | 20020085288 A | 11/2002 |

OTHER PUBLICATIONS

Partial Translation of Office Action of Chinese Application No. 2012101916444, Issued Nov. 18, 2015, State Intellectual Property Office of PRC, 7 Pages.

*Primary Examiner* — Hieu T Vo
*Assistant Examiner* — Arnold Castro
(74) *Attorney, Agent, or Firm* — Julia Voutyras; Alleman Hall McCoy Russell & Tuttle LLP (57) ABSTRACT

A system and method for determining the oil pressure of an internal combustion engine is disclosed herein. The system and/or method may estimate the oil pressure using the response of two variable camshaft timing actuators having respective phase angle change control signals. Specifically, the signals may be used to determine whether the oil pressure is below a low oil pressure threshold value. The rate of response of the actuators may also be used to determine a current engine oil pressure.

19 Claims, 5 Drawing Sheets

(56) References Cited

U.S. PATENT DOCUMENTS

| | | | | |
|---|---|---|---|---|
| 2007/0068474 A1* | 3/2007 | Cinpinski | ............ | F01L 1/3442 123/90.17 |
| 2007/0157900 A1* | 7/2007 | Suzuki | ...................... | F01L 1/02 123/196 AB |
| 2010/0004831 A1 | 1/2010 | Lee | | |
| 2011/0016958 A1* | 1/2011 | Cinpinski | ................. | F01L 1/34 73/114.43 |
| 2011/0046847 A1* | 2/2011 | Hansson | ................... | F01M 5/02 701/36 |
| 2012/0316751 A1* | 12/2012 | Eastwood | ................ | F01M 1/20 701/102 |

\* cited by examiner

Fig. 1

| Row | A | B | C | D | E | R | Z |
|---|---|---|---|---|---|---|---|
| 1 | 0 | 1 | 0 | 0 | 0 | 0 | 0 |
| 2 | 0 | 1 | 0 | 0 | 0 | 1 | 1 |
| 3 | 0 | 1 | 0 | 0 | 1 | 0 | 0 |
| 4 | 0 | 1 | 0 | 0 | 1 | 1 | 0 |
| 5 | 0 | 1 | 0 | 1 | 0 | 0 | 0 |
| 6 | 0 | 1 | 0 | 1 | 0 | 1 | 1 |
| 7 | 0 | 1 | 0 | 1 | 1 | 0 | 0 |
| 8 | 0 | 1 | 0 | 1 | 1 | 1 | 0 |
| 9 | 0 | 1 | 1 | 0 | 0 | 0 | 0 |
| 10 | 0 | 1 | 1 | 0 | 0 | 1 | 1 |
| 11 | 0 | 1 | 1 | 0 | 1 | 0 | 0 |
| 12 | 0 | 1 | 1 | 0 | 1 | 1 | 0 |
| 13 | 0 | 1 | 1 | 1 | 0 | 0 | 1 |
| 14 | 0 | 1 | 1 | 1 | 0 | 1 | 1 |
| 15 | 0 | 1 | 1 | 1 | 1 | 0 | 1 |
| 16 | 0 | 1 | 1 | 1 | 1 | 1 | 1 |
| 17 | 1 | 0 | 0 | 0 | 0 | 0 | 1 |
| 18 | 1 | 0 | 0 | 0 | 0 | 1 | 1 |
| 19 | 1 | 0 | 0 | 0 | 1 | 0 | 1 |
| 20 | 1 | 0 | 0 | 0 | 1 | 1 | 1 |
| 21 | 1 | 0 | 0 | 1 | 0 | 0 | 1 |
| 22 | 1 | 0 | 0 | 1 | 0 | 1 | 1 |
| 23 | 1 | 0 | 0 | 1 | 1 | 0 | 1 |
| 24 | 1 | 0 | 0 | 1 | 1 | 1 | 1 |
| 25 | 1 | 0 | 1 | 0 | 0 | 0 | 1 |
| 26 | 1 | 0 | 1 | 0 | 0 | 1 | 1 |
| 27 | 1 | 0 | 1 | 0 | 1 | 0 | 1 |
| 28 | 1 | 0 | 1 | 0 | 1 | 1 | 1 |
| 29 | 1 | 0 | 1 | 1 | 0 | 0 | 1 |
| 30 | 1 | 0 | 1 | 1 | 0 | 1 | 1 |
| 31 | 1 | 0 | 1 | 1 | 1 | 0 | 1 |
| 32 | 1 | 0 | 1 | 1 | 1 | 1 | 1 |

SYSTEM AND METHOD FOR MONITORING ENGINE OIL PRESSURE

CROSS REFERENCE TO RELATED APPLICATION

The present application claims the benefit of and priority to United Kingdom Patent Application No. 1109668.2, filed on Jun. 9, 2011, the content of which is incorporated herein by reference for all purposes.

BACKGROUND/SUMMARY

A user of a motor vehicle having an internal combustion engine may be provided with information regarding the oil pressure in the engine. Specifically, the user may be provided with an indication if the oil pressure is so low that damage to the engine may occur. With some engines this is achieved by using a pressure actuated switch and a tell-tale red light incorporated as part of an instrument cluster of the motor vehicle. If the oil pressure is below a particular level then the switch closes and the red light is illuminated to warn the driver that the oil pressure is dangerously low.

It is increasingly becoming a legal requirement for the oil pressure of the engine to be monitored for fuel economy related features such as, for example, a two stage oil pump and this may require the use of an oil pressure sensor that can provide a signal indicative of the oil pressure in the engine. However, a dedicated oil pressure sensor may increase the cost and complexity of the engine.

As such in one approach, a system for monitoring the oil pressure in a cost effective and simplified manner is provided. An oil pressure monitoring system for an internal combustion engine having a variable camshaft timing system including at least one engine oil pressure operated camshaft timing actuator wherein the system comprises a camshaft timing sensor providing an output signal indicative of the operation of each respective camshaft timing actuator, an electronic processing unit receiving the signal from each respective variable camshaft timing sensor and use the received signal to provide an output indicative of the oil pressure of the engine, is provided.

In some examples, the output signal received from each variable camshaft timing sensor may be information regarding the phasing of the respective camshaft and the electronic processing unit is operable to determine a phase angle rate of change of the respective variable camshaft timing actuator from each received signal and use the determined rate of phase angle change to estimate the current oil pressure of the engine.

Further in some embodiments, the oil pressure monitoring system may include two camshaft timing actuators each having a respective camshaft timing sensor associated therewith to provide a phase angle signal to the electronic processing unit and the electronic processing unit may be operable to estimate the current oil pressure based upon a phase angle rate of change of the camshaft timing actuators derived from the received phase angle signals.

Additionally in some examples, the oil pressure may be estimated using one of a look-up table and an algorithm stored in the electronic processing unit.

In another example, the oil pressure monitoring system may include at least two camshaft timing actuators each having an engine oil pressure released lock to hold the respective actuator in a predetermined position and a respective camshaft timing sensor associated with each actuator to provide a phase angle signal to the electronic processing unit and, if the signals from the camshaft timing sensors indicate that at least two of the actuators are not operating, the electronic processing unit may be operable to provide an output indicative that the oil pressure of the engine is below a low oil pressure threshold value.

Additionally in some examples, the oil pressure monitoring system may further comprise a Human Machine Interface and the electronic processing unit may provide the output via the Human Machine Interface.

The oil pressure monitoring system may further comprise an ignition switch and a sensor providing a signal indicative of whether the engine is running to the electronic processing unit and the electronic processing unit may be further operable to determine whether the engine is running and, if the engine is not running and the ignition switch is on, to provide the output indicative that the oil pressure of the engine is below the low oil pressure threshold value.

Further in some examples, the electronic processing unit may be further operable to maintain an oil pressure status log of the oil pressure status when the oil pressure was last checked and, if no camshaft phase changes are being requested and at least one of the camshaft timing actuators is sensed to be operating, the electronic processing unit is operable to use the last oil pressure status recorded in the log to determine whether the oil pressure is below the low oil pressure threshold value.

In another example, an internal combustion engine having the variable camshaft timing system and the oil pressure monitoring system described above may be provided.

Further in some examples, a method for monitoring the oil pressure of an internal combustion engine is provided. The engine includes a variable camshaft timing system including an engine oil pressure operated camshaft timing actuator and a camshaft timing sensor. Furthermore, the method comprises providing, via the sensor, a signal indicative of operation of the camshaft timing actuator; and providing an output indicative of the engine oil pressure of the engine based on the signal.

In some examples, at least two camshaft timing actuators each having an engine oil pressure released lock to hold the respective actuator in a predetermined position and a respective camshaft timing sensor associated with each actuator to provide a phase angle signal and the method may further comprise providing an indication that the oil pressure of the engine is below a low oil pressure threshold value if the signals from the camshaft timing sensors indicate that at least two of the actuators are not operating.

The method may further comprise determining whether an ignition switch is on and the engine is running and, if the ignition switch is on and the engine is not running, providing an output indicative that the oil pressure of the engine is below the low oil pressure threshold value.

The method may further comprise maintaining an oil pressure status log of the oil pressure the oil pressure when the oil pressure was last checked and, if no camshaft phase changes are being requested and a least one camshaft actuator is sensed to be operating using the last oil pressure status recorded in the log.

In some examples the method may further comprise determining a phase angle rate of change of each camshaft timing actuators and using the determined rate of change to estimate the current oil pressure of the engine.

The method may further comprise using one of a look-up table and an algorithm to estimate the current oil pressure.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The Invention is described in more detail below with reference to FIGS. 1-4.

DETAILED DESCRIPTION

Figure 1:
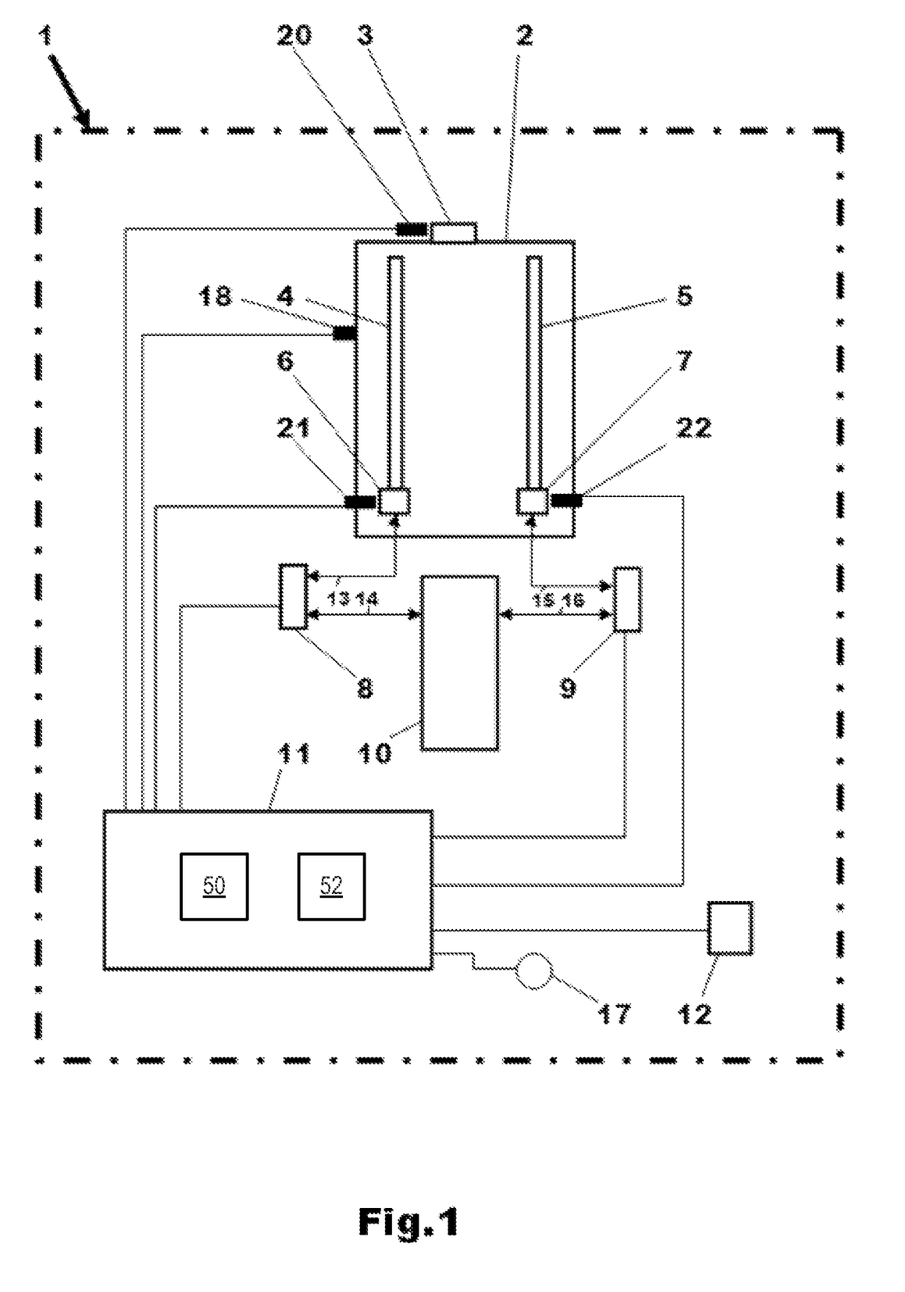
FIG. 1 is a block diagram of a motor vehicle having an oil monitoring system according to one aspect of the invention.
Figure 2:
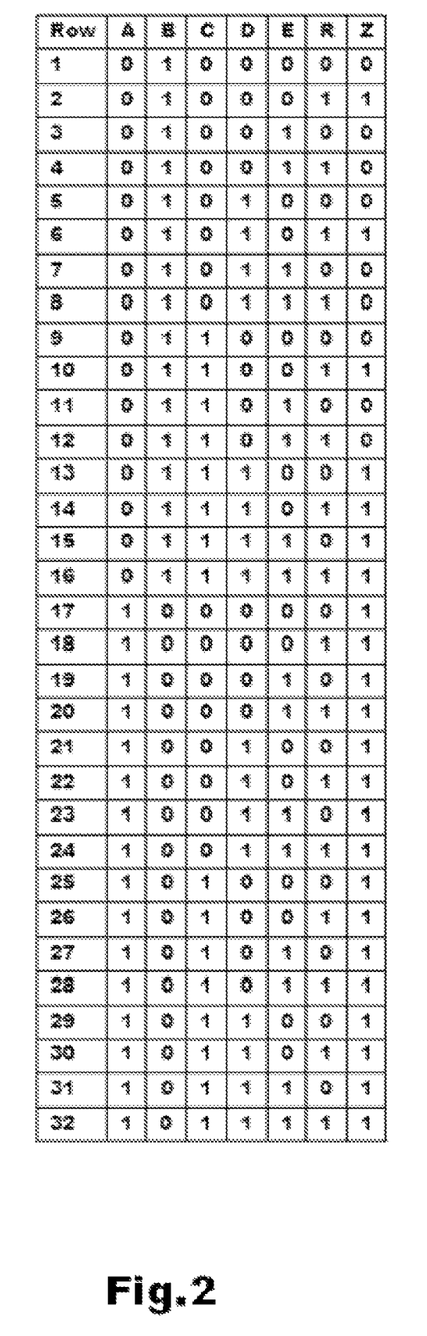
FIG. 2 is a truth table showing the various variables used to establish whether a low oil pressure condition exists.
Figure 3:
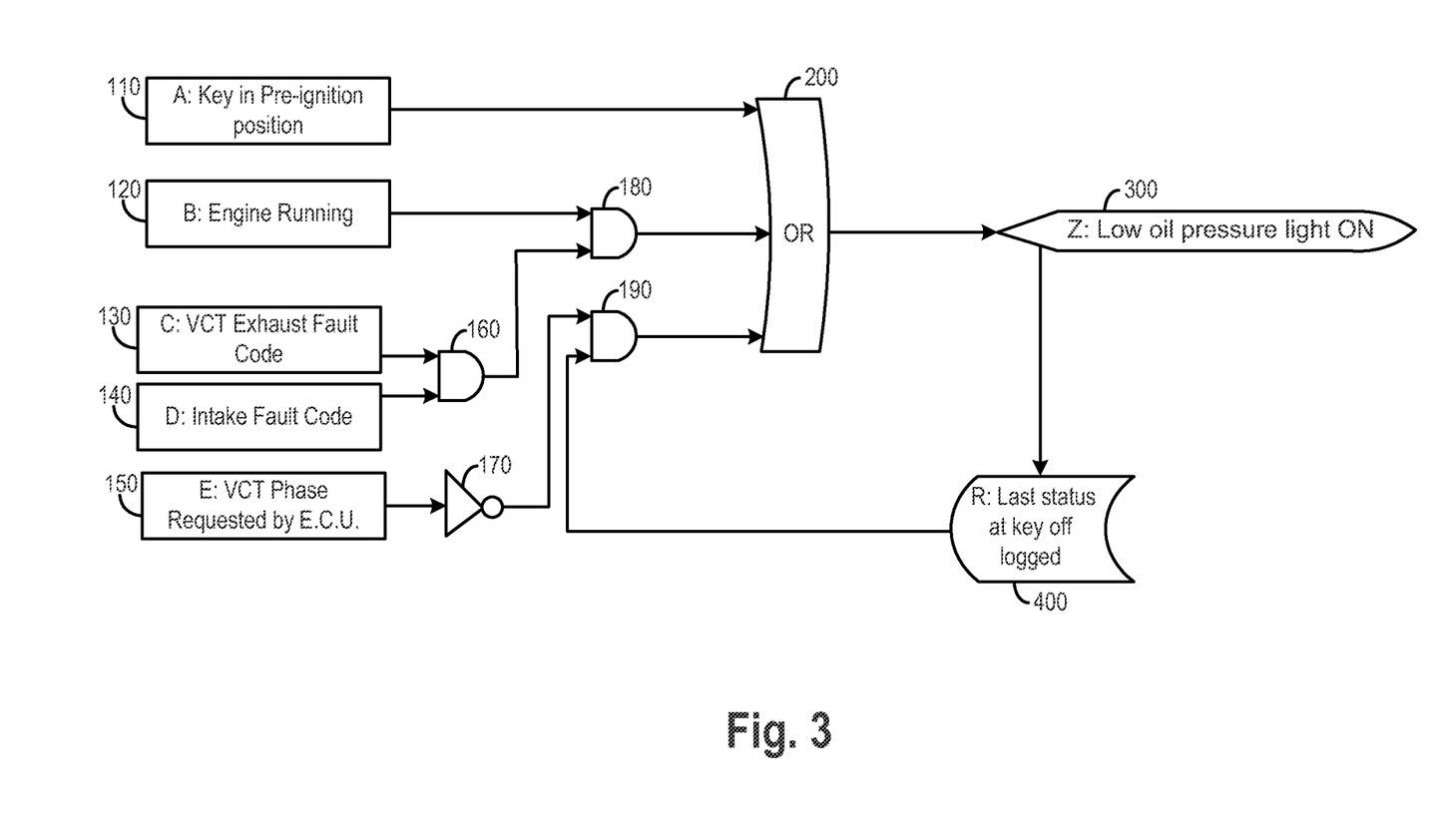
FIG. 3 is a logic flow chart used to establish whether a low oil pressure condition exists.

Referring now to FIGS. 1 to 3 there is shown a motor vehicle 1 having an internal combustion engine 2, an oil supply system 10 for the engine 2 and an electronic processing unit which in this case is in the form of a Powertrain Control Module (PCM) 11 but could be formed by some other electronic device such as for example an engine control unit. The electronic processing unit may include memory 50 executable by a processor 52. The memory 50 may include code or instructions stored therein to perform the methods, functions, etc., described below.

The engine 2 has an exhaust camshaft 4 and an inlet camshaft 5 and is fitted with an oil pressure operated camshaft variable timing system. Furthermore, the variable camshaft timing system comprises two oil pressure operated actuators 6, 7, two camshaft timing sensors 21, 22 associated with the two actuators 6, 7 and two servo control valves 8, 9 controlled by the PCM 11.

Oil may be supplied to the engine 2 from the oil supply system 10. The oil supply system may include a pump, filter and oil reservoir in the form of an engine sump. The oil supply system 10 supplies oil to and receives oil back from the servo valve 8 via supply and return conduits shown diagrammatically as line 14 on FIG. 1 and also supplies oil to and receives oil back from the servo valve 9 via supply and return conduits shown diagrammatically as line 16 on FIG. 1.

The servo valve 8 may supply oil to and receives oil back from the variable camshaft timing actuator 6 via supply and return conduits shown diagrammatically as line 13 on FIG. 1 and the servo valve 9 may supply oil to and receives oil back from the variable camshaft timing actuator 7 via supply and return conduits shown diagrammatically as line 15 on FIG. 1.

Each of the variable camshaft timing actuators 6, 7 may include a hydraulic pressure controlled locking pin to lock the actuator in a specific phase angle position relative to a crankshaft of the engine 2. The locking pin may be spring loaded into the locked position and is released when the oil pressure exceeds a predetermined level. One example of such a locking pin and servo valve control is disclosed in GB Patent 2,444,504 but it will appreciated that the camshaft variable timing system is not limited to the system disclosed therein and is generally applicable to all variable camshaft timing systems using an oil pressure released locking pin.

Examples of oil supply systems for variable camshaft timing systems can be found in GB Patent 2,402,970 and in U.S. Pat. No. 6,871,620 and an example of the construction of a variable camshaft timing actuator such as the actuators 6, 7 can be found in U.S. Pat. No. 6,814,038.

The rotational position and speed of a crankshaft 3 of the engine 2 may be sensed by a profile ignition pickup (PIP) sensor 20 associated with a nose portion of the crankshaft 3. A description of a system for using the output from the PIP sensor 20 with the two camshaft timing sensors 21, 22 for detecting the position of a variable position camshaft is disclosed in GB Patent 2,284,685.

The camshaft variable timing system, the two camshaft timing sensors 21, 22, the two camshafts 4, 5, the PCM 11, the PIP sensor 20, the servo valves 8, 9, a Human Machine Interface (HMI) 12 described in greater detail herein, and/or an ignition key sensor 17 may be included in an oil pressure monitoring system. Furthermore, it will be appreciated that additional components described herein may be included in the oil pressure monitoring system.

The PCM 11 is operable to receive information from an ignition key sensor 17, from the PIP sensor 20 and from the two camshaft timing sensors 21, 22 along with other information regarding the state of the engine 2 and the torque requested from a driver of the motor vehicle 1 and control the phasing of the two camshafts 4, 5 accordingly by the two servo valves 8, 9. It will be appreciated that the ignition key sensor 17 may be an ignition switch.

The PCM 11 is also operable to monitor the oil pressure of the engine 2 using the information it receives from ignition key sensor 17, the PIP sensor 20 and the two camshaft timing sensors 21, 22.

It will be appreciated that the term ignition key sensor means any device that can determine whether the ignition of the motor vehicle 1 is on or off and is not limited to a sensor for a key operated switch.

The first oil monitoring task performed by the PCM 11 is the determination of whether the oil pressure is below a predefined low limit. Operation of the engine 2 with an oil pressure below this low oil pressure threshold value may result in damage to the engine 2 and so a driver of the motor vehicle 1 may be alerted to the fact that damage may be occurring to enable the driver to take action to prevent further damage.

To assess whether the oil pressure is below the low oil pressure threshold value, the PCM 11 may monitor several activities and combines these to determine whether the oil pressure is below the low oil pressure threshold value, these activities are summarized in the truth table shown in FIG. 2 along with the output result "Z".

The activity shown in column "A" is whether the engine is in a pre-ignition state as determined by the state of the ignition key sensor 17 and whether the engine 2 is running as can be established from the PIP sensor 20. If the engine 2 is in a pre-ignition state then this is indicated in column "A" as a '1' and if the engine 2 is not in a pre-ignition state then this is indicated as '0' in column "A".

The activity shown in column "B" is whether the engine 2 is running which can be established from the PIP sensor 20 or by another suitable sensor, calculation, etc. If the engine 2 is running then this is indicated in column "B" as a '1' and if the engine 2 is not running then this is indicated as '0' in column "B".

The activity shown in column "C" is whether the exhaust camshaft actuator 6 is operating based upon the feedback from the camshaft timing or phase sensor 21. If the oil pressure is low the locking pin associated with the actuator 6 will be engaged and so there will be no changes in phase. A '1' in column "C" indicates that no change in phase has occurred and a '0' indicates that a phase change has occurred.

The activity shown in column "D" is whether the inlet camshaft actuator 7 is operating based upon the feedback from the camshaft timing or phase sensor 22. If the oil pressure is low the locking pin associated with the actuator 7 will be engaged and so there will be no changes in phase. A '1' in column "D" indicates that no change in phase has occurred and a '0' indicates that a phase change has occurred.

The activity shown in column "E" is whether a change in camshaft phase has been requested by the PCM 11 for the two actuators 6, 7. A '0' in column "E" indicates that no change in phase has been requested and a '1' indicates that a phase change has been requested.

The activity shown in column "R" is the currently recorded oil pressure state stored in the PCM 11 as an oil pressure status log. A '1' in column "R" indicates that the oil pressure last recorded was below the oil pressure lower limit and a '0' indicates that the oil pressure last recorded was above the low oil pressure threshold value.

Column "Z" shows the output from this truth table with a '1' indicating an oil pressure below the low oil pressure threshold value and '0' indicating an oil pressure above the low oil pressure threshold value.

FIG. 3 shows in a diagrammatic manner the processes performed by the PCM 11 to produce the result "Z".

Boxes 110 to 150 are the inputs corresponding to the columns "A" to "E" in the truth table and as described above with regard to FIG. 2. The output from the box 110 is sent to the 'OR' box 200. The outputs from boxes 130 and 140 are combined in an adder 160 and the result is sent to an adder 180 where it is combine with the input from box 120 with the result going to the 'OR' box 200.

The input from box 150 is inverted in the inverter 170 and the result is combined in an adder 190 with the last recorded oil pressure status logged at box 400 and sent to the 'OR' box 200.

The 'OR' box 200 performs the logical statement:—

Z=(Result from 110 OR Result from 180 OR Result from 190)

That is to say, the PCM 11, shown in FIG. 1, performs the logic statement:—

Z=[(A) or (B and (C and D)) or (not E and R)]

Therefore, if the ignition key sensor 17 is on but the engine 2, shown in FIG. 1, is not running, the result is given in rows 17 to 32 of the truth table in FIG. 2 and in all cases this will result in a low oil pressure result (Z=1). If the engine is running the results are given in rows 1 to 16 and can be broken down into several different circumstances.

If there has been no phase change requested and at least one of the actuators 6, 7, shown in FIG. 1, is operating, then the last oil pressure registered is used and so the result Z may be equal to the last registered oil pressure status as indicated in rows 1, 2, 5, 6, 9, 10 and, if neither of the actuators is operating then the result is Z=1 as indicated in rows 13, 14.

If a phase change has been requested then the result "Z" depends upon whether both of the actuators 6, 7, shown in FIG. 1, have failed to respond to the phase change request. If both of the actuators 6, 7 have failed to respond then this is interpreted as a situation where the oil pressure is below the low oil pressure threshold value because it is unlikely that both of the actuator 6, 7 would simultaneously fail. This result is shown in rows 15 and 16. If only one of the actuators 6, 7 has failed to respond then this could be due to a fault in the non-responding actuator 6, 7 such as a jammed actuator or a sealing issue and so the result is Z=0 as indicated in rows 7, 8, 11 and 12 and the oil pressure is above the low oil pressure threshold value. This may be because one of the actuators 6, 7 has responded and so the locking pin associated with that actuator 6, 7 has been released thereby indicating that oil pressure is present above the low oil pressure threshold value which is set at the release pressure for the locking pins.

Whenever the result is Z=1 indicating that the oil pressure is below the low oil pressure threshold value the PCM 11 is further operable to alert a driver of the motor vehicle via a Human Machine Interface (HMI) 12, shown in FIG. 1, connected to the PCM 11.

The HMI 12 could take many forms and could for example comprise a red warning light on an instrument panel of the motor vehicle 1 and a display in which messages can be displayed. The PCM 11 could be further operable to illuminate the red warning light whenever the oil pressure is below the low oil pressure threshold value that is to say, whenever Z=1 and also display a message such as "Low oil pressure Stop Engine" when the result is achieved via one of rows 13 to 16.

Although the vehicle has been described as having an engine with two camshafts it will be appreciated that it could be applied with equal benefit to an engine having more than two camshafts and more than two variable camshaft timing actuators. For example, it could be applied to V6 and V8 engines having two camshafts per bank where at least two camshafts of the engine have variable camshaft timing.

The second oil monitoring task performed by the PCM 11 is the determination of the current oil pressure of the engine 2. In order to perform this task the PCM 11 may use the feedback signals from the two camshaft phase sensors 21, 22 to determine the rate of change of phase angle for a requested phase angle change. It will be appreciated that the rate of change of phase angle is dependent upon the pressure of the oil supplied to the two actuators 6, 7 and so by calculating the rate of phase angle change and using a relationship between rate of phase angle change to oil pressure, a value of the current oil pressure can be obtained.

The relationship between rate of phase angle change and oil pressure may be derived by experimental work using several engines and is then may be stored in the PCM 11 either as a look-up table or in the form of an algorithm. In both cases an allowance for oil temperature may be made and so in order for the PCM 11 to perform the oil pressure estimating step the current temperature of the oil can be established. This can be achieved directly by using an oil temperature sensor such as the oil temperature sensor 18 shown on FIG. 1 or can be derived from other information such as, for example, a measurement of the temperature of part of the engine 2 or a measurement of the temperature of the engine coolant.

Therefore, if the PCM 11 uses a look up table to estimate oil pressure, the PCM 11 may determine the current oil temperature, the rate of phase angle change and uses these values to obtain from the look-up table an estimate of the current oil pressure which can then be supplied or used by any other system or process wanting knowledge of the current oil pressure. For example, the PCM 11 or other suitable controller may use the estimated oil pressure in algorithms for advancing or retarding the timing of the cams. Specifically, the estimated oil pressure may be used in calculations for controlling the variable camshaft timing actuators (6 and 7), the servo valves (8 and 9), the pump in the oil supply system, etc. In this way, the estimated oil pressure calculation may serve a dual purpose. It will be appreciated that the oil pressure may be estimated without the used of a dedicated oil pressure sensor, if desired. In this way, the number of sensors in the motor vehicle is reduced, thereby reducing the cost and complexity of the motor vehicle.

It will be appreciated that the determination of the oil pressure could be derived from the rate of phase angle change from only one of the camshafts 4, 5 but preferably the rate of phase angle change of both camshafts 4, 5 is used. The rate of phase angle results from both of the camshafts 4, 5 could be averaged or combined in some other manner such as, for example, by using the higher value.

Although the vehicle has been described above in relation to an engine having two camshafts it will be appreciated that the oil pressure could be estimated and could be applied with equal benefit to any engine having a single camshaft with variable camshaft timing or to V6 and V8 engines having multiple camshafts with variable camshaft timing. It will also be appreciated that it is not necessary for the variable camshaft timing actuators to be fitted with an oil pressure released locking device for the current oil pressure to be estimated when using this approach. It is equally applicable to variable camshaft timing actuators having no locking feature or a locking device operated in another manner such as, for example, via an electric solenoid. It would also be possible to use such an approach to indicate when the oil pressure is unacceptably low by comparing the rate of phase change with a predefined rate of change limit and if the rate of change is below the limit using this as an indication that the oil pressure is unacceptably low.

Figure 4A:
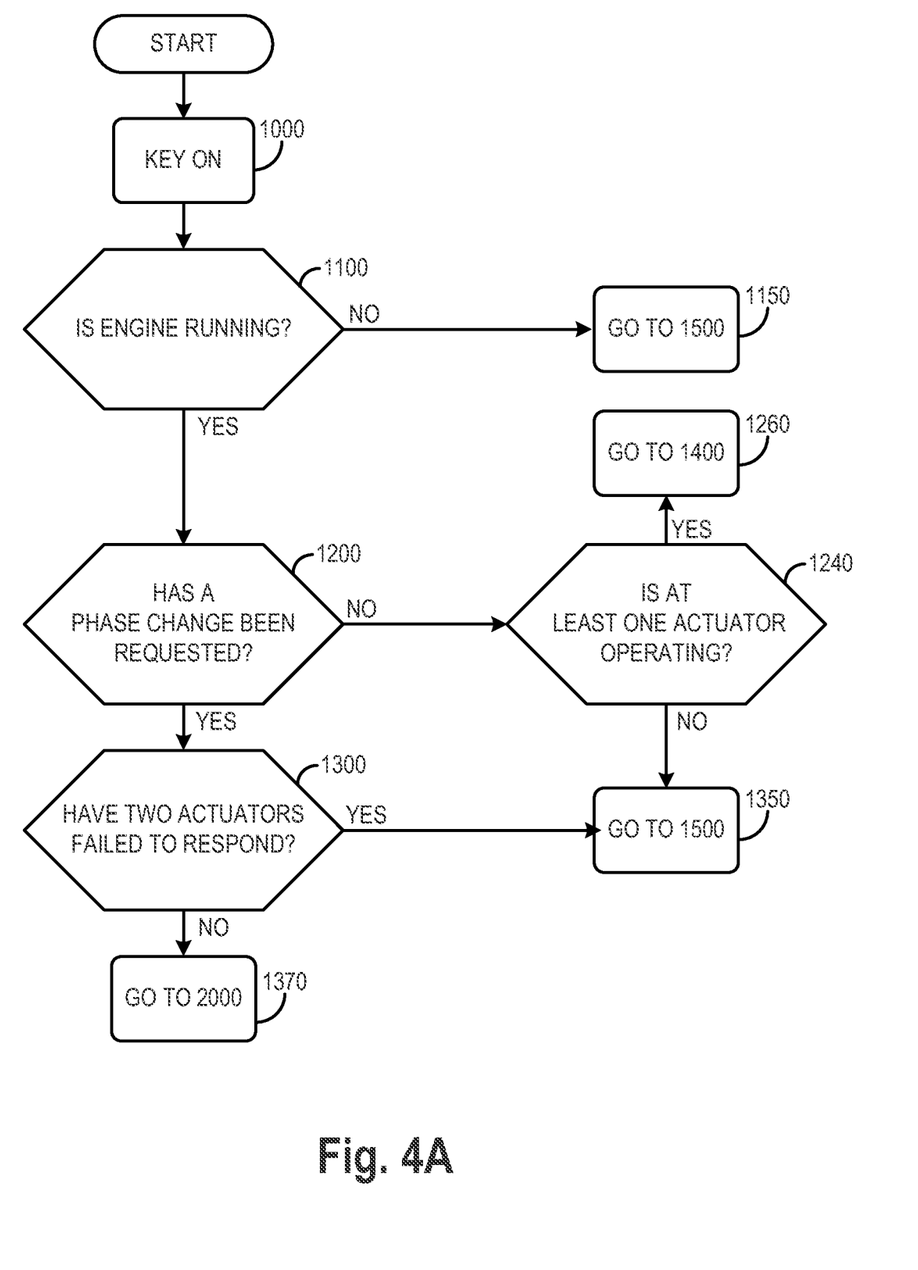
FIGS. 4A and 4B are flows charts showing a method for monitoring the oil pressure of an engine according to a further aspect of the invention.
Figure 4B:
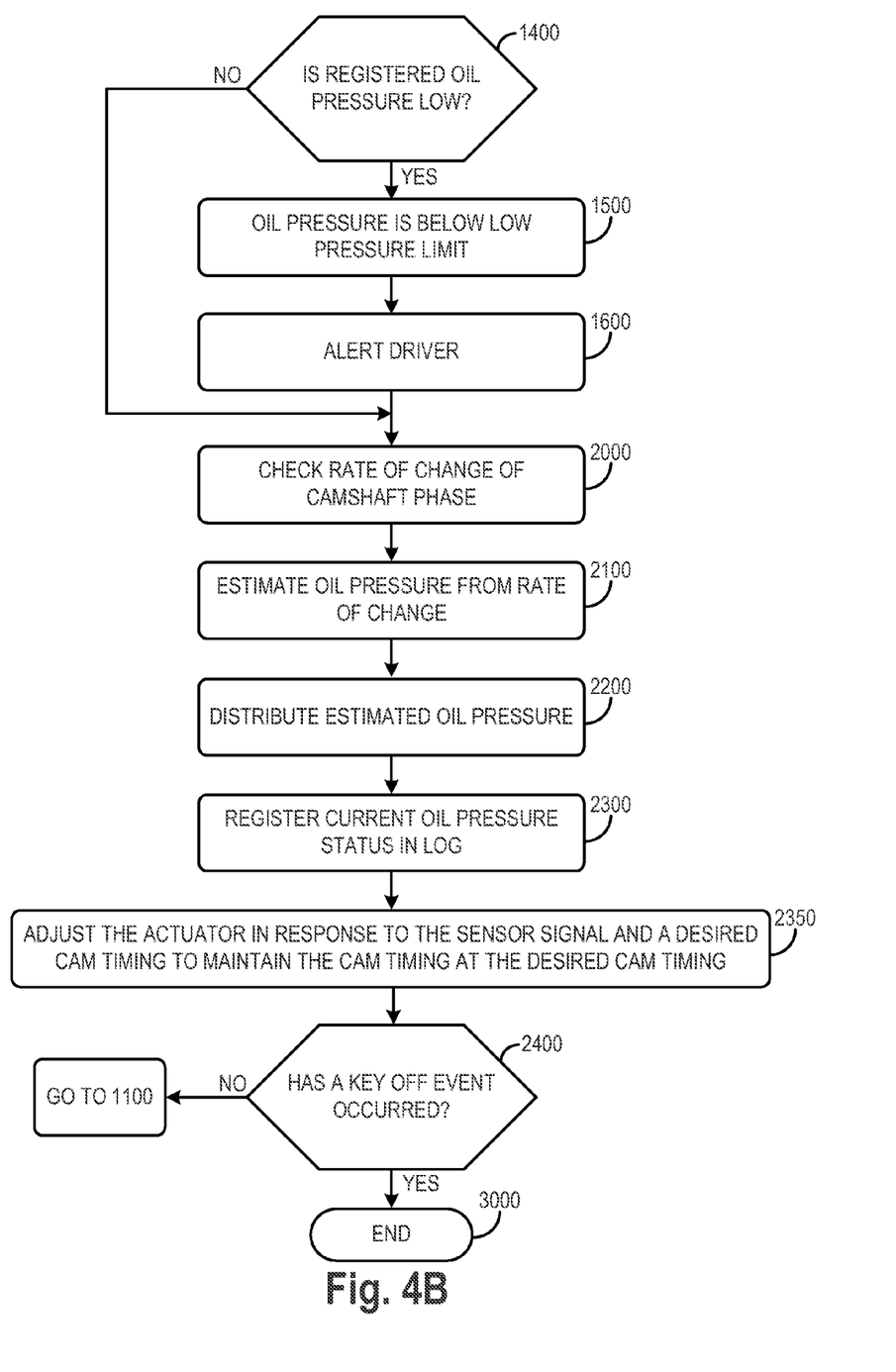

Referring now to FIGS. 4A and 4B there is shown as a simplified flow chart a method for monitoring the oil pressure of an engine.

Referring firstly to the steps shown in FIG. 4A, the method starts at box 1000 with a Key-on event then at box 1100 it is determined whether the engine 2 is running. If the engine 2 is not running then this is equivalent to a pre-ignition event and the method advanced to box 1150. If the engine 2 is running, then the method advances from box 1100 to box 1200.

In box 1200 it is determined whether a camshaft phase change has been requested for the camshafts 4, 5. If a camshaft phase change has not been requested the method advances to box 1240 but if a phase change has been requested the method advances to box 1300.

In box 1240 it is determined whether at least one of the actuators 6, 7 is operating, if they are, then the method advances to box 1260 but otherwise the method advances to box 1350.

In box 1300 it is determined whether both of the variable camshaft timing actuators 6, 7 have failed to respond to the requested phase change and if they have both failed to operate the method advances to box 1350 but if at least one of the variable camshaft timing actuators 6, 7 has responded to the phase change request then the method advances to box 1370.

Referring now with reference to the steps shown on FIG. 4B, if the result of the test in box 1240 has been passed, then in box 1260 shown in FIG. 4A, the method advances to box 1400. In box 1400 the last registered oil pressure state is checked and, if the last registered status indicates that the oil pressure is low, the method advances to box 1500 but if the last registered oil pressure status is not low then the method advances to box 2000. If the result of the test in box 1240 has been failed, then the method advances to box 1350 and on to box 1500.

In box 1500 the oil pressure status is updated to being a low oil pressure status that is to say, the oil pressure is assumed to be below the low oil pressure threshold value. The box 1500 can be entered via the box 1400 or from the boxes 1150 and 1350 shown on FIG. 4A.

The method then advances to box 1600 where the driver is alerted to the fact that the engine oil pressure is unacceptably low. This step may be performed via the HMI 12, shown in FIG. 1.

The method then advances to box 2000 which can be entered from the box 1600 from box 1400 or from box 1370 shown on FIG. 4A. In box 2000 the rate of change of phase angle for the two camshafts 4, 5 is calculated. The calculation may be based on a signal from a corresponding camshaft timing sensor. In this way, a signal indicative of operation of the camshaft timing actuator may be provided via a camshaft timing sensor. Subsequently, the rate of change of phase angle is used in box 2100 to estimate the current oil pressure by using a look-up table referencing rate of phase angle change and oil temperature to oil pressure or by the use of an algorithm defining a relationship between oil pressure and the rate of change of phase angle and oil temperature.

The method then advances to step 2200 where the estimated oil pressure is then distributed and/or stored for use by other systems and processes that may want knowledge of oil pressure. In this way, an output indicative of the engine oil pressure of the engine based on the signal indicative of operation of the camshaft timing sensor is provided to various systems, components, etc., in the vehicle. Thus, the output indicative of the engine oil pressure may be generated via the PCM 11. For example, the output may be provided to the HMI 12, shown in FIG. 1.

Then in step 2300 the current oil pressure status is registered for future use and the method advances to box 2350 where the method includes adjusting the actuator in response to the sensor signal and a desired cam timing to maintain the cam timing at the desired cam timing. It will be appreciated that in some embodiment box 2350 may not be included in the method. After box 2350 the method advances to box 2400 where it is determined whether a key-off event has occurred. If a key-off event has occurred, the method ends in box 3000 but, if a key-off event has not occurred, the method returns to box 1100.

It will be appreciated that the method shown in FIGS. 4A and 4B is one example of a method and that the invention is not limited to the steps shown or to the order in which the steps are executed.

It will be further appreciated that the PCM 11 may be programmed to perform part of the method shown in FIGS. 4A and 4B. For example, it may just perform the low oil pressure monitoring steps shown in boxes 1000 to 1600, 2300 and 3000. In which case, a failure of the tests in box 1300 and 1400 would lead to box 2300 and not to box 2000 and the steps indicated in boxes 2000, 2100 and 2200 would not be present.

Similarly, just the current oil pressure may be monitored in which case, the steps shown in boxes 1100 to 1600 and 2300 would not be present and the method would advance directly from box 1000 to box 2000 and would loop back from box 2400 not to box 1100 but to box 2000.

Therefore in summary, for an engine start-up where an oil activated pin is used to lock a camshaft to its drive sprocket in a known position and oil pressure acting against a spring force releases this pin, permitting relative cam movement, the rate at which this angular movement can occur (VCT switching speed) may be affected by the oil pressure supplied to the cam phase actuator.

A low oil-pressure condition may therefore be indicated in two ways:

(a) Zero phasing due to insufficient oil pressure to release the locking pin; and (b) Slower-than-expected cam phase shifting speed.

If either of these symptoms is detected then the oil pressure switch can be deleted if desired thereby saving cost and system complexity. In addition, if symptom b) can be quantified then the pressure-warning set point (e.g., 30 kPa with an example oil pressure-switch), could be defined as a function of engine speed. This would allow it to be set much nearer to the expected pressure value of a healthy engine, providing the driver and/or a vehicle limp-home mode with more time to take remedial action prior to significant engine damage being caused.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A motor vehicle comprising:
an internal combustion engine comprising:
an oil pressure monitoring system comprising:
a variable camshaft timing system including at least one engine oil pressure operated camshaft timing actuator;
a camshaft timing sensor providing an output signal indicative of operation of each respective camshaft timing actuator; and
an electronic processing unit receiving signals from each respective variable camshaft timing sensor and including instructions stored in memory executable by a processor to generate an output indicative of engine oil pressure based on each received signal.

2. The motor vehicle of claim 1, wherein the output signal received from each variable camshaft timing sensor is information regarding phasing of the respective camshaft, and wherein the electronic processing unit is operable to determine a phase angle rate of change of the respective variable camshaft timing actuator from each received signal and use the determined rate of phase angle change to estimate a current oil pressure of the engine.

3. The motor vehicle of claim 2, wherein there are two camshaft timing actuators included in the oil pressure monitoring system, each having a respective camshaft timing sensor associated therewith to provide a phase angle signal to the electronic processing unit, and wherein the electronic processing unit is operable to estimate the current oil pressure based upon a phase angle rate of change of the camshaft timing actuators derived from the received phase angle signals.

4. The motor vehicle of claim 3, wherein the oil pressure is estimated using one of a look-up table and an algorithm stored in the electronic processing unit.

5. The motor vehicle of claim 1, wherein there are at least two camshaft timing actuators in the oil pressure monitoring system each having an engine oil pressure released lock to hold the respective actuator in a predetermined position and a respective camshaft timing sensor associated with each actuator to provide a phase angle signal to the electronic processing unit and, if the signals from the camshaft timing sensors indicate that at least two of the actuators are not operating, the electronic processing unit is operable to provide an output indicative that the oil pressure of the engine is below a low oil pressure threshold value.

6. An oil pressure monitoring system in an internal combustion engine comprising:
a variable camshaft timing system including at least one engine oil pressure operated camshaft timing actuator;
a camshaft timing sensor providing an output signal indicative of operation of each respective camshaft timing actuator; and
an electronic processing unit including code stored in memory executable by a processor to receive signals from each respective variable camshaft timing sensor and use at least one received signal to provide an output indicative of an oil pressure of the engine.

7. The oil pressure monitoring system of claim 6, wherein the output signal received from each variable camshaft timing sensor is information regarding phasing of the respective camshaft and the electronic processing unit is operable to determine a phase angle rate of change of the respective variable camshaft timing actuator from each received signal and use the determined rate of phase angle change to estimate a current oil pressure of the engine.

8. The oil pressure monitoring system of claim 7, wherein the variable camshaft timing system includes two camshaft timing actuators, each having a respective camshaft timing sensor associated therewith to provide a phase angle signal to the electronic processing unit and the electronic processing unit is operable to estimate a current oil pressure based upon a phase angle rate of change of the camshaft timing actuators derived from the received phase angle signals.

9. The oil pressure monitoring system of claim 8, wherein the oil pressure is estimated using one of a look-up table and an algorithm stored in the electronic processing unit.

10. The oil pressure monitoring system of claim 6, wherein the variable camshaft timing system includes at least two camshaft timing actuators, each having an engine oil pressure released lock to hold the respective actuator in a predetermined position and a respective camshaft timing sensor associated with each actuator to provide a phase angle signal to the electronic processing unit and, if the signals from the camshaft timing sensors indicate that at least two of the actuators are not operating, the electronic processing unit provides an output indicative that the oil pressure of the engine is below a low oil pressure threshold value.

11. The oil pressure monitoring system of claim 10, further comprising a Human Machine Interface and where the electronic processing unit provides the output via the Human Machine Interface.

12. The oil pressure monitoring system of claim 11, further comprising an ignition switch and a sensor providing a signal indicative of whether the engine is running and the electronic processing unit is further operable to determine whether the engine is running and, if the engine is not running and the ignition switch is on, to provide the output indicative that the oil pressure of the engine is below the low oil pressure threshold value.

13. The oil pressure monitoring system of claim 12, wherein the electronic processing unit is further operable to maintain an oil pressure status log of an oil pressure status when the oil pressure was last checked and, if no camshaft phase changes are being requested and at least one of the camshaft timing actuators is sensed to be operating, the electronic processing unit is operable to use a last oil pressure status recorded in the log to determine whether the oil pressure is below the low oil pressure threshold value.

14. A method for monitoring engine oil pressure, an engine having a variable camshaft timing system including an engine oil pressure operated camshaft timing actuator and a camshaft timing sensor, comprising:
providing, via the sensor, a signal indicative of operation of the camshaft timing actuator;
providing an output indicative of the engine oil pressure of the engine based on the signal; and determining a phase angle rate of change of the camshaft timing actuator and using the determined rate of change to estimate a current oil pressure of the engine.

15. The method of claim 14, wherein there are at least two camshaft timing actuators each having an engine oil pressure released lock to hold the respective actuator in a predetermined position and a respective camshaft timing sensor associated with each actuator to provide a phase angle signal and the method further comprises providing an indication that the engine oil pressure of the engine is below a low oil pressure threshold value if the signals from the camshaft timing sensors indicate that at least two of the actuators are not operating.

16. The method of claim 15, further comprising determining whether an ignition switch is on and the engine is running and, if the ignition switch is on and the engine is not running, providing an output indicative that the oil pressure of the engine is below the low oil pressure threshold value.

17. The method of claim 16, further comprising maintaining an oil pressure status log of the oil pressure when the oil pressure was last checked and, if no camshaft phase changes are being requested and at least one camshaft actuator is sensed to be operating, using a last oil pressure status recorded in the oil pressure status log.

18. The method of claim 17, further comprising using one of a look-up table and an algorithm to estimate the current oil pressure.

19. The method of claim 14, further comprising adjusting the actuator in response to the sensor signal and a desired cam timing to maintain a cam timing at the desired cam timing.

* * * * *